(12) United States Patent
Dooley et al.

(10) Patent No.: US 11,106,984 B2
(45) Date of Patent: Aug. 31, 2021

(54) ADAPTIVE PREDICTIVE ANALYTICS FOR DESIGN MODIFICATION REQUESTS

(71) Applicant: Accenture Global Solutions Limited, Dublin (IE)

(72) Inventors: Robert Dooley, Dublin, CA (US); Grace T. Cheng, Mountain View, CA (US); Alex M. Kass, Palo Alto, CA (US)

(73) Assignee: Accenture Global Solutions Limited, Dublin (IE)

( * ) Notice: Subject to any disclaimer, the term of this patent is extended or adjusted under 35 U.S.C. 154(b) by 951 days.

(21) Appl. No.: 15/711,752

(22) Filed: Sep. 21, 2017

(65) Prior Publication Data

US 2019/0087733 A1 Mar. 21, 2019

(51) Int. Cl.
*G06N 5/04* (2006.01)
*G06N 3/02* (2006.01)
*G06Q 10/08* (2012.01)
*G06N 20/00* (2019.01)

(52) U.S. Cl.
CPC ............ *G06N 5/04* (2013.01); *G06N 3/02* (2013.01); *G06N 20/00* (2019.01); *G06Q 10/087* (2013.01)

(58) Field of Classification Search
CPC .. G06Q 10/087; G06Q 10/06; G06Q 10/0633; G06Q 1/1097; G06Q 50/04; G06N 3/02; G06N 5/04; G06N 20/00
See application file for complete search history.

(56) References Cited

U.S. PATENT DOCUMENTS

| 2002/0052862 | A1 | 5/2002 | Scott et al. |
| 2002/0143598 | A1* | 10/2002 | Scheer ............... G06Q 10/06 705/7.26 |
| 2003/0097642 | A1* | 5/2003 | Arai .................. G06F 30/00 716/102 |

(Continued)

OTHER PUBLICATIONS

Niknam et al., "Towards a decision support system for engineering change management," International design conference'Design 2014, Dubrovnik, Croatia, May 19-22, 2014 (Year: 2014).*

(Continued)

*Primary Examiner* — Miranda M Huang
*Assistant Examiner* — Yao D Huang
(74) *Attorney, Agent, or Firm* — Fish & Richardson P.C.

(57) ABSTRACT

Methods, systems, and apparatus, including computer programs encoded on a computer storage medium, for a predictive analytics system that provides a mechanism to change the design or implementations of a product manufactured in a supply chain are disclosed. In one aspect, a method includes the actions of receiving training data that includes private information for a node in a supply chain network and information regarding previous decisions related to product change requests for a product manufactured through the supply chain network; training, using the training data, a predictive model configured to render decisions for requests to change a part used in manufacturing the product; receiving a request to change a given part; applying the predictive model to the request to change the given part; determining a decision approving or denying the request; and transmitting the decision to the requesting node.

19 Claims, 4 Drawing Sheets

(56) References Cited

U.S. PATENT DOCUMENTS

| | | | | |
|---|---|---|---|---|
| 2005/0022156 | A1* | 1/2005 | Schwan | G06Q 10/10 |
| | | | | 717/102 |
| 2009/0099879 | A1* | 4/2009 | Ouimet | G06Q 10/10 |
| | | | | 705/7.12 |
| 2012/0017082 | A1* | 1/2012 | Davies | G06F 16/10 |
| | | | | 713/156 |
| 2013/0197842 | A1* | 8/2013 | Ugorji | G06Q 10/06395 |
| | | | | 702/82 |
| 2016/0267570 | A1* | 9/2016 | Hodges | H04L 67/32 |
| 2016/0342914 | A1* | 11/2016 | Nawal | G06Q 10/06313 |
| 2016/0379128 | A1* | 12/2016 | Bouchard | G06N 20/00 |
| | | | | 706/12 |
| 2017/0236081 | A1* | 8/2017 | Grady Smith | G06Q 10/067 |
| | | | | 705/7.36 |

OTHER PUBLICATIONS

Lin et al., "Integrating multi-agent negotiation to resolve constraints in fulfilling supply chain orders," Electronic Commerce Research and Applications 5 (2006) 313-322 (Year: 2006).*

Zhang et al., "Decision Making for a Risk-Averse Dual-Channel Supply Chain with Customer Returns" in F. Dargam et al. (Eds.): EWG-DSS 2013, LNBIP 184, pp. 118-130, 2014. (Year: 2014).*

Quality One, "Production Part Approval Process (PPAP)", Jun. 24, 2017 (archived). Retrieved from https://web.archive.org/web/20170624055218/https://quality-one.com/ppap/ (Year: 2017).*

* cited by examiner

ADAPTIVE PREDICTIVE ANALYTICS FOR DESIGN MODIFICATION REQUESTS

TECHNICAL FIELD

This application generally relates to predictive analytics and modeling.

BACKGROUND

Predictive analytics involves the use of data, statistical algorithms, artificial intelligence (AI), and/or machine-learning to build various predictive models. Such predictive models may be trained through data mining techniques as applied to historical data from an applicable context. Trained predictive models can be used directly to estimate an output given a defined set of data as input, or indirectly to drive the choice of decision rules. For example, a trained predictive model can be used to predict values for differing or new sets of data as well as to identify a likelihood of future outcomes.

SUMMARY

Implementations of the present disclosure are generally directed to an adaptive predictive analysis network. More specifically, implementations are directed to an automated system that employs a series of AI modules that each generate and train a predictive model. The trained predictive models are used to provide responses to product change and update requests within an associated supply chain. Such responses may include approval/denial of the request, selection of various options presented in the request, recommended solutions to the request, and/or an explanation regarding the content of the response.

In some implementations, actions include receiving training data that includes private information for a node in a supply chain network and information regarding previous decisions related to product change requests for a product manufactured through the supply chain network, training, using the training data, a predictive model that is configured to render decisions that approve or deny requests to change a part used in manufacturing the product, receiving, from a requesting node in the supply chain network, a request to change a given part, applying the predictive model to the request to change the given part, based on applying the predictive model to the request to change the given part, determining a decision approving or denying the request, and transmitting the decision to the requesting node. Other implementations of this aspect include corresponding systems, apparatus, and computer programs, configured to perform the actions of the methods, encoded on computer storage devices.

In some implementations, actions include based on applying the predictive model to the request, determining a plurality of other nodes in the supply chain to forward the request, transmitting the request to the other nodes, receiving a response from each of the other nodes, wherein each response includes an approval or denial of the request, applying the predictive model to the received responses, based on applying the predictive model to the received responses, determining the decision approving or denying the request, and transmitting additional information with the request to the other nodes, where the additional information is determined based on applying the predictive model to the request. Other implementations of this aspect include corresponding systems, apparatus, and computer programs, configured to perform the actions of the methods, encoded on computer storage devices.

These and other implementations can each optionally include one or more of the following features: at least one of the other nodes corresponds to an Original Equipment Manufacturer (OEM) and wherein the response received from the OEM node overrides the decision determined based on applying the predictive model to the received responses, the supply chain is an automotive supply chain, and wherein the OEM manufactures vehicles with the product, the requesting node is a supplier in a lower tier than the node in the supply chain, the private information includes data regarding the manufacturing process of the product or the actual cost of the product, wherein the training data includes public information shared among the nodes within the supply chain, and the predictive model utilizes a neural network, machine learning, deep learning, contextual intelligence, or data clustering.

Implementations of the present disclosure improve the efficiency and accuracy of predictive modeling supply chain management computer systems by employing predictive models trained with both the private data of a respective node within the supply chain and previous decisions related to product change requests in the supply chain. It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

Like reference numbers and designations in the various drawings indicate like elements.

DETAILED DESCRIPTION

Predictive models can use one or more classifiers in trying to determine the probability of a set of data belonging to another set and may include a number of predictors, which are variables that are likely to influence future results. To build a predictive model, data is collected for the relevant predictors and a statistical algorithm is formulated. Such a statistical algorithm may employ a simple linear equation, or it may be a complex neural network, mapped out by sophisticated software. The predictive model is created or trained by testing and validating the formulated statistical algorithm with, for example, mined historical data to predict the probability of an outcome. Once trained, a predictive model can be applied to similar type data to analyze results without the historical data. Such analysis may result in predictions that represent a probability of a target variable based on estimated significance from a set of input variables. Furthermore, as additional data becomes available, the model may be validated, revised, and/or retrained.

Predictive analytics and the use of predictive models are increasingly important to supply chain management. For example, by employing such models trained with relevant historical supply chain data, supply chain management processes are made more accurate and reliable, which serve to, for example, reduce cost. A predictive model may be selected for use within a specific supply chain on the basis of testing, validation, and evaluation using a probability of outcomes for a given set of input data.

The sequence of processes involved in the production and distribution (e.g., the supply chain) of a complex commodity, such as an automobile, may require a large number of entities and effective communication between them. Consequently, it becomes difficult to coordinate product updates that efficiently and effectively fill customers' needs and increase the overall value and quality of the respective complex commodity ultimately produced by the supply chain. Further complicating matters, each node in the supply chain has private business information that it may not be willing to share and public information that it is willing to share with other nodes in the supply chain. Such communication models make the communication of change requests and the resulting decision(s) to appropriate stakeholders difficult as a typical solution may require human interaction to obtain the various approvals and to disseminate the necessary information once the change has been approved or denied. Furthermore, such changes are difficult to implement mid-process due in part to the stringency of requirements and the relative reluctance of parties to go through the original requirements gathering process. The information may also need to be compiled and presented to the decision makers within an organization.

The manufacturing of a single component of a commodity produced through a supply chain can include input from any number of suppliers, both within and outside of the manufacturer of the commodity. A supplier may supply a component, such as a seat or headlight, or may provide a service, such as marketing of the commodity. Each supplier in turn has its own suppliers that supply parts and services to it. For example, a seat manufacture may receive component parts, such as seat material, housing, microcircuits, or motors, from various part and material suppliers. The seat manufacture may also perform internal services for production of seats, such as functional testing. Any change or update request made or suggested by a part or component supplier (e.g., suggesting the use of a different component part) must be passed along the supply chain, both up and down, to relevant stakeholders. This change request will be accepted or denied based on the relationship between the supply chain nodes and their knowledge of the design, such as, the necessary steps or changes required to accommodate the change and/or and what effect the change will have to the overall process. Thus, a greater level of decision making regarding change requests would enable customization and increase agility within a supply chain without jeopardizing its robustness.

In view of the foregoing, implementations of the present disclosure are generally directed to a predictive analytics system that provides a mechanism to change the design or implementations of a product (e.g., a component, part, or raw material) manufactured in a supply chain based on a change request initiated by a node (e.g., an entity or stakeholder) in the supply chain. In some implementations, the node requesting the change may be responsible for the delivery of a component (e.g., a seat) or the ultimate commodity of the supply chain (e.g., an automobile) or the requestor may be a contractor or sub-contractor of one of these nodes. The supply chain may also include nodes that may not be providing parts for the product as it is currently designed, but may have the capability to provide parts based on the current design or the design with the requested change. The relationship between nodes in a supply chain is described in greater detail below with regard to FIG. 1.

In some implementations, the disclosed system includes AI modules employing machine learning and predictive modeling to facilitate and/or make decisions regarding, for example, a request to change or update a product within an associated supply chain. In some implementations, the system provides a mechanism for how a change request is accepted, denied, or sent to a human actor for further review. This mechanism may be based on the relationship between the supply chain nodes, their unique knowledge of the design of a particular component or part, and overall, how the potential change may affect the entire process. The system also provides mechanisms to accommodate a change after approvals have been provided or otherwise obtained.

Figure 1:
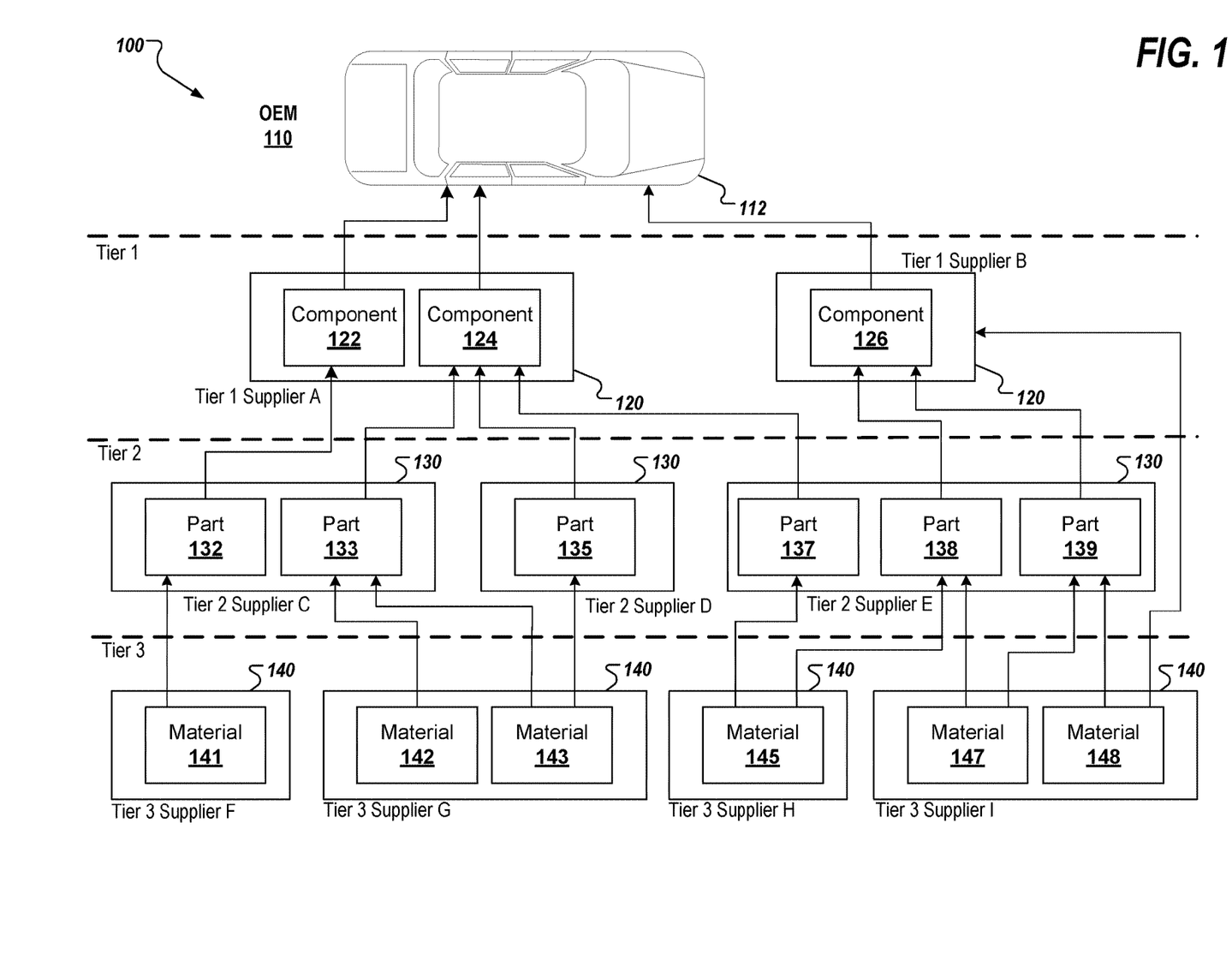
FIG. 1 provides a block diagram showing an example of an automotive supply chain.

FIG. 1 provides a block diagram showing an example of a supply chain 100 that is involved in building and distributing a complex commodity. The example supply chain 100 is an automotive supply chain, however, the disclosed system may be employed within any sort of supply chain involving the manufacturing and distribution of a complex commodity. The example supply chain 100 includes an Original Equipment Manufacturer (OEM) 110, which ultimately manufactures a commodity, such as vehicle 112. Manufacturing a vehicle (or any complex commodity) generally includes assembling many parts and performing many processes. Each of those parts and processes are provided by suppliers, both internal to and external to the OEM 110. An external supplier that supplies the OEM 110 directly may be referred to as a Tier 1 supplier, such as Tier 1 Suppliers A and B 120. Each Tier 1 Supplier 120 may, in turn, be supplied by suppliers external to it. These suppliers may be referred to as Tier 2 Suppliers, such as Tier 2 Suppliers C, D, and E 130. Each Tier 2 Supplier 130 may in turn be supplied by Tier 3 Suppliers, such as Tier 3 Suppliers F, G, H and I 140, and so forth. FIG. 1 depicts three Tiers servicing the OEM in the depicted supply chain 100; however, any number of Tiers may support a particular supply chain depending on, for example, the type of commodity being constructed and/or industry practice.

An OEM, such as OEM 110 may be an automotive manufacturer. An automotive OEM may produce some original equipment and also design and market their vehicles; order the parts from suppliers, such as suppliers A-I; and assemble the final product, such as vehicle 112. For example, OEM 110 may use order data received from customers to design new vehicles and source components, such as component 122, 124, and 126, from Tier 1 suppliers.

A Tier 1 Supplier, such as Tier 1 Supplier A and B 120, are entities, or nodes, that supply components or systems directly to OEM 110. For an automotive supply chain, Tier 1 suppliers specialize in making "automotive-grade" hardware, which is built to withstand the motion, temperature, and longevity demands of OEMs. Tier 1 suppliers 120 may purchase various parts, such as parts 132, 133, 135, 137, 138, and 139, from Tier 2 suppliers as well as raw materials, such as materials 141, 142, 143, 145, 147, and 148, from Tier 3 suppliers. All of which may be packaged or integrated into automotive-grade systems and/or components, e.g., when supplying components within an automotive supply chain.

A Tier 2 Supplier, such as Tier 2 Supplier C, D, or E, supplies parts that may eventually be used in the component of a complex commodity, such as vehicle 112. Tier 2 nodes do not typically sell to OEMs. Examples of Tier 2 suppliers include computer chip manufacturers. Tier 2 suppliers may be an expert in their specific domain, but often support a variety of OEMs in various diverse industries.

A Tier 3 Supplier, such as Tier 3 Supplier F, G, H, or I, supplies raw, or close-to-raw, materials, such as materials 141, 142, 143, 145, 147, and 148. The materials include metal and plastic and are supplied by a Tier 3 Supplier to other suppliers and/or the OEM in a supply chain, such as supply chain 100. The materials may be used as the base materials to make specialized parts, products, systems, and components. In many supply chain implementations, OEMs as well as Tier 1 and Tier 2 suppliers may each require raw materials. As such, Tier 3 Suppliers may supply products directly to each level.

Figure 2:
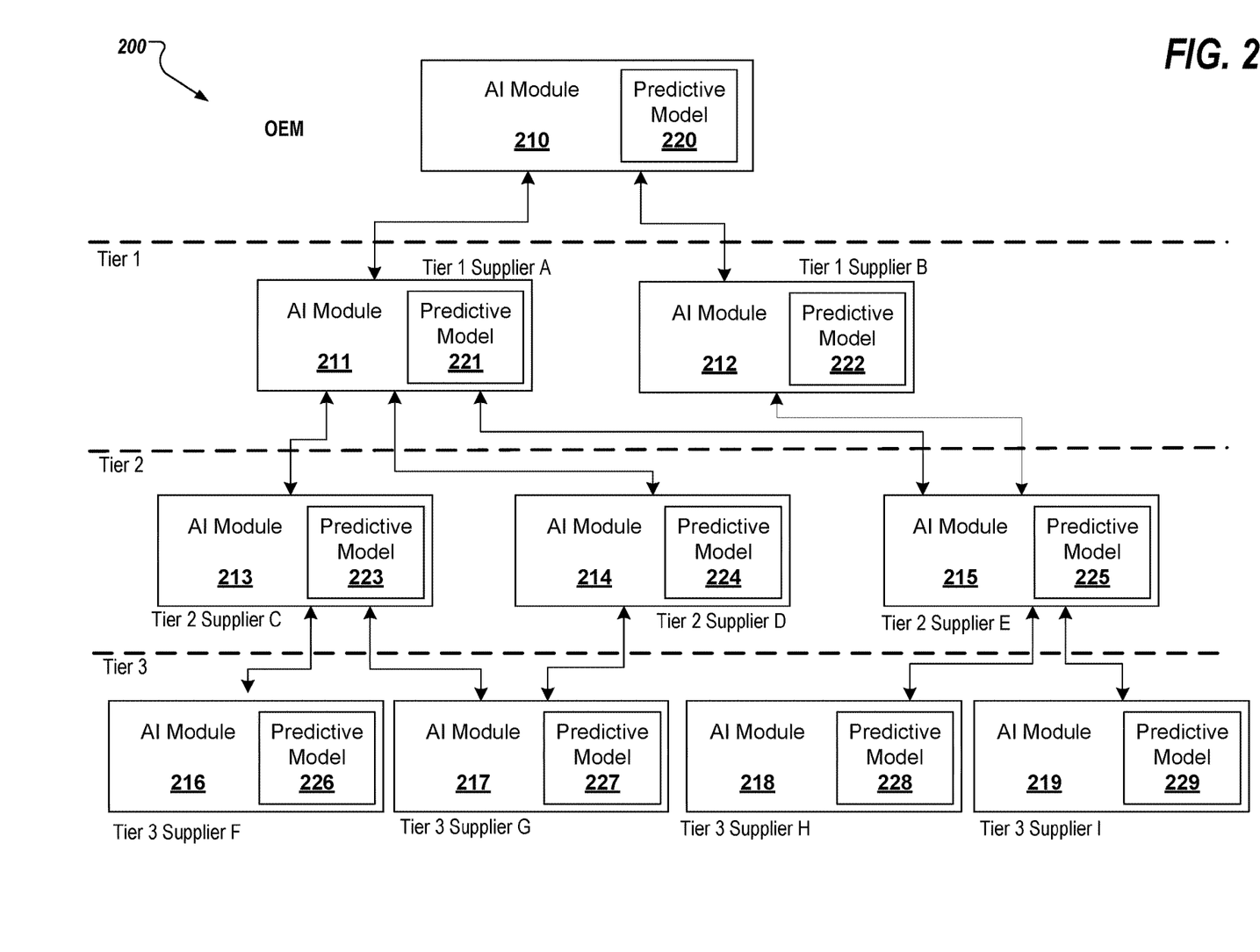
FIG. 2 depicts an example of an adaptive predictive analysis network.

FIG. 2 depicts an example adaptive predictive analysis network 200. Network 200 includes a number of AI modules 210-219. Network 200 may be deployed to a supply chain, such as supply chain 100. To deploy network 200, each AI module 210-219 is assigned to a node (e.g., an entity or stakeholder), such as a supplier or OEM, within the respective supply chain. Each AI module 210-219 includes a respective predictive model 220-229 that is trained using data, both private and public, from a respective assigned node as well as public data, including previous decisions regarding requests within the supply chain network, from the other nodes within the network 200. For example, the model training data may include previous approved design requests and changes, data identifying the node, the node's location in the supply chain network, the public information shared among nodes within the supply chain 100, and private information from the node. Private information may include, for example, how a particular component or part is made and/or the actual cost of the component or part.

AI modules 210-219 work together within the adaptive predictive analysis network 200 to find an optimal solution regarding change requests while considering, for example, price and delivery date as requested by the OEM. Such a predictive analysis network 200 thereby improves both the accuracy and efficiency with which decisions regarding updates or changes are made within the respective supply chain network.

Each AI module 210-219 within the adaptive predictive analysis network 200 generates and trains a respective predictive model 220-229 based on public data within the supply chain and private data from a corresponding assigned node. Once trained, predictive models 220-229 are employed to provide responses to product change and update requests. Such responses may include approval/denial of the request, selection of various options presented in the request, and/or recommended solutions to the request. The responses may also include an explanation regarding how or why the respective predictive model made the determination as well as any public information used to determine the response. Each predictive model 220-229 may utilize neural networks, machine learning, deep learning, contextual intelligence, and/or data clustering to determine the approval or denial responses.

Each predictive model 220-229 employed within respective AI modules 210-219 is trained with training data. Training data may include past histories of decisions for product change requests within the supply chain or related past supply chains. The training data may also include proprietary information of the corresponding assigned entry. In some implementations, when sending a response, each AI module 210-219 may decide whether or not to share proprietary information or other relevant decision making information with the other AI modules 210-219 based on factors such as relevance to the respective request and/or the type of product the decision is regarding. Other relevant training data includes price points (both public and private) and internal design specifications and requirements. As decisions are made by AI modules 210-219 within adaptive predictive analysis network 200, the relevant information may be distributed to each predictive model 220-229 to further train and refine the models.

The process of training each predictive model 220-229 involves providing a machine learning algorithm along with the above-mentioned training data. In some implementations, the machine learning algorithm discovers patterns in the training data that map the input data (e.g., the request for product and part updates) to a target. The output of the training is a predictive module, such as predictive models 220-229, that captures these discovered patterns.

Once the predictive models 220-229 have been trained with the data for the particular supply chain, the respective AI modules 210-219 may be deployed within the network 200 to make decisions regarding product change requests to, for example, update or change a product (e.g., material, part or component) ultimately used by the OEM in the manufacturing of the commodity. For instance, a Tier 1 supplier may have a new component (e.g., a motor, foam, circuit board, frame, or microchip) that does not quite meet the approved specification. The supplier, however, may think that the new component would be an improvement to the end product or the manufacturing process. The requests may include information regarding the respective product, which may include the product's specifications and price as well as a requested date to update the product in the supply chain. In some implementations, the change request is sent up the supply chain to an AI module assigned to a node that uses the requested product, for example, AI modules 211 and 212 assigned to a Tier 1 supplier node or to AI module 210 assigned to an OEM node that uses the requested product. By way of example, AI module 213 assigned to Tier 2 supplier node C may send a request to the AI module 211 assigned to a Tier 1 supplier node A that is using a part supplied by the Tier 2 supplier node C.

AI modules 210-219 process a received request with the respective trained predictive models 221-229. Each predictive model 221-229 may provide decisions based on attributes of the requested update or product change. These attributes may include price, materials, dimensions, weights, performance metrics, and testing that the product has undergone. Additional information considered by the model may include timing considerations, whether the product will trigger a regulation process, or any legal issues. When a request is approved by predictive model 221-229, the respective AI module 210-219 may then send the request to other AI modules 221-229 up the supply chain (e.g., to AI module 210 assigned to the OEM node) and down the supply chain (e.g., to AI modules 213-215 assigned to other Tier 2 supplier nodes). The AI module 210-219 that received the original or subsequent request may include some additional information when forwarding the request to the other AI modules 210-219. In some implementations, the additional information is generated based on output from the respective trained predictive model 221-229, the context of the request, and/or a state of the network 200 or corresponding supply chain. In some implementations, the additional information may differ as to what is sent to nodes up the supply chain versus what is sent to nodes down the supply chain based on relevance and context of each respective node. In this manner, a requested change or update to a product may be propagated throughout the network 200 to relevant nodes (e.g., stakeholders) to determine whether the change or update to the product is going to be problematic and/or what other changes may need to be implemented to facilitate the change or update.

In some implementations, the distance from the original requestor within the adaptive predictive analysis network 200 may have an effect as to which nodes received the request for input and the relevance or weight given to the input received regarding the request from a respective node. Ultimately, a request for a change or update to a product within adaptive predictive analysis network 200 will either be approved, denied, or escalated to human decision makers through, for example, a work flow process for the corresponding supply chain by an AI module 210-219.

When an AI module 210-219 makes a determination based on the respective predictive model 221-229 as to whether there is an issue or whether to approve the request, the AI module 210-219 may send a response to the requestor that may include an approval or a denial along with any objections and/or relevant information regarding the determination. The response may also include selection of various options presented in the request or recommended solutions for the request. When all or a determined subset of the AI modules 210-219 assigned to nodes that correspond to the relevant stakeholders with network 200 approve the request, the change can be made. In some implementations, an AI module assigned to a node that is higher in the supply chain, such as AI module 210, might overrule a rejection received from an AI module assigned to a node lower in the supply chain, such as AI module 219.

As an example, an AI module 211 assigned to a Tier 1 supplier node A may receive a request from an AI module 213 assigned to a Tier 2 supplier node C. AI module 211 may determine not to deny the initially request based on predictive model 221. AI module 211 may determine, through predictive module 221, which other AI modules within network 200 to forward the request to and what additional information, if any, to include with each request. For example, AI module 211 may determine to forward the request to AI module 210 assigned to the OEM node and AI module 214 assigned to the Tier 2 supplier node D. If, for example, AI module 210 sends back a denial, AI module 211 may forward the denial to AI module 213. If, however, AI module 210 sends back an approval but AI module 214 sends back a denial, AI module 211 may send the denial to AI module 213. Continuing with this example, alternatively, AI module 211 may overrule the denial received from AI module 214 based on a determination by predictive model 221 or based on the approval received from AI module 210 because AI node 210 is higher in the supply chain network and thus may overrule a decision made by a lower node.

Additionally, as referenced above, the adaptive predictive analysis network 200 may provide feedback to the AI modules 210-219 based on the determinations and decisions made. The feedback may be employed by the AI modules 210-219 to further train and refine their respective predictive models 220-229. Likewise, predictive models 220-229 may be retrained when the private data for the respective AI modules 210-219 is updated, when an action by a human actor overrides a decision or otherwise provides feedback and/or instruction, or when the public data within the supply chain is updated. In this manner, the feedback may increase the accuracy of the predictive models 220-229 by providing the most current and relevant training information.

In alternative implementations, a single, trusted AI module may be employed within predictive analysis network 200. In such implementations, each node securely communicates both private and public information with the trusted AI module. The trusted AI module may train a single predictive model or, alternatively, a predictive model for each respective node within the network 200. The predictive model(s) is trained using the information provided by each network node and retrained as node information is updated and decisions are made by the predictive module(s) as described in detail above with respect to predictive modules 220-229. The trusted AI module provides decisions regarding product change requests received from nodes within the network 200 based on the analysis and output of the trained predictive model(s). Such implementations, for example, reduce the amount of communication between the nodes in the network 200 thereby reducing both processing and network usage.

By making determinations regarding change requests almost instantaneously through the employment of a network of distributed AI modules 210-219 assigned to various nodes within a supply chain or through a network of nodes providing information to and receiving instructions from a trusted AI module, predictive analysis network 200 improves both the efficiency and accuracy of supply chain management computer systems. At the same time, predictive analysis network 200 protects the security of each node's private data by providing, through AI modules 210-219, access to predictive models 220-229 (or alternatively, a single predictive model accessed through a single, trusted AI module) trained with the private data without providing direct access to the private data to the other nodes.

Figure 3:
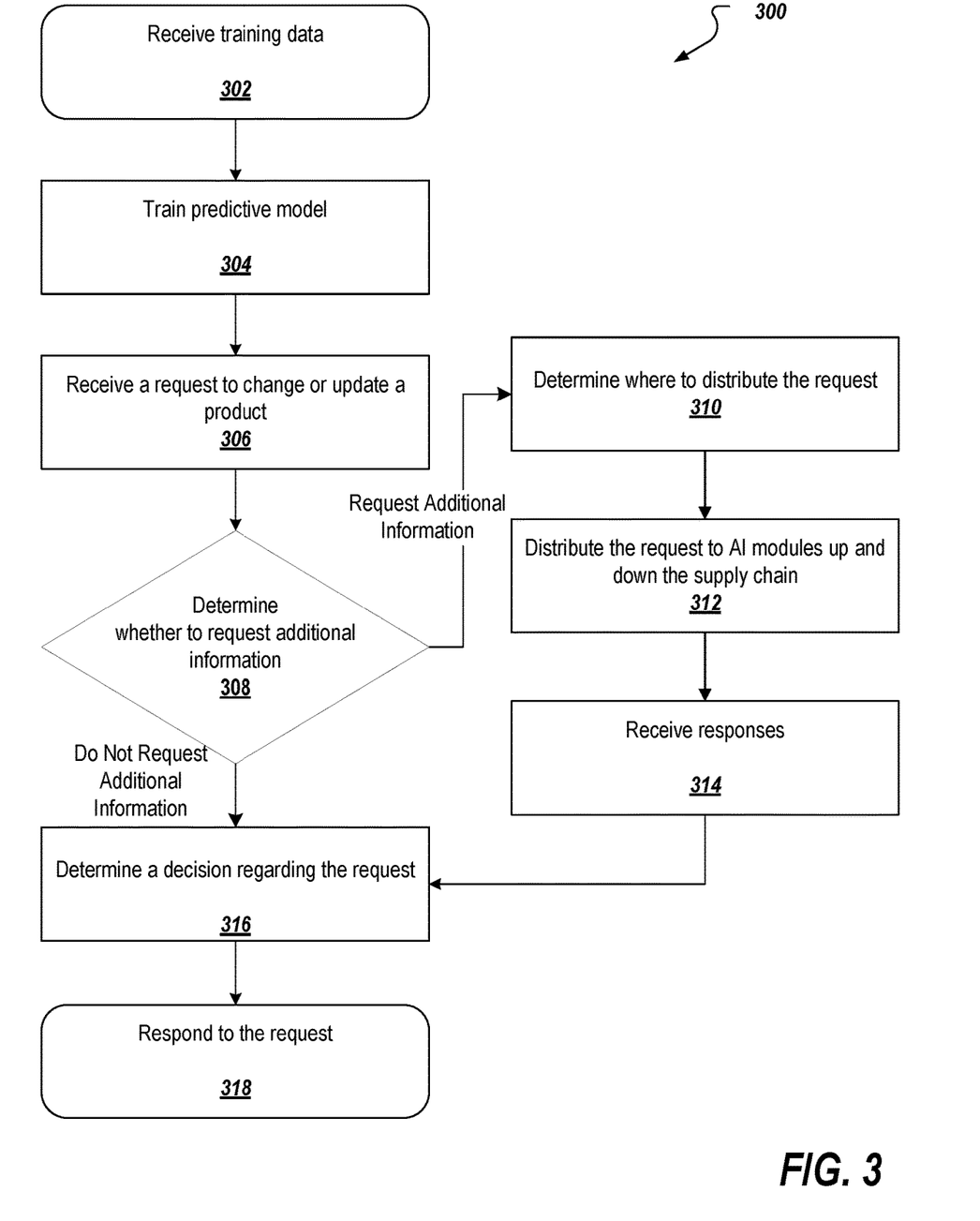
FIG. 3 depicts a flow diagram of an example process employed within an adaptive predictive analysis network.

FIG. 3 depicts a flow diagram of an example process (300) employed within an adaptive predictive analysis network, such as adaptive predictive analysis network 200. Example process 300 may be used to determine a response for a supply chain node to request to change or update a product within a respective supply chain, such as supply chain 100. An AI module receives (302) training data from the network 200 and an assigned node, such as a product supplier within the supply chain. The training data may include public information available to nodes associated with the supply chain and information private to the assigned node. The AI module trains (304) a predictive model using the received training data. The AI module receives (306) a request to change or update a product within the supply chain. Through the trained predictive model, the AI module determines (308) whether to request additional input from other AI models within the network. The AI module optionally determines (310) which AI modules to request input from (e.g., forward the request to). The AI module optionally distributes (312) the request along with any determined relevant information to the determined AI modules servicing nodes both up (e.g., an OEM or a higher Tier supplier) and down (e.g., a lower Tier supplier) the supply chain. The AI module optionally receives (314) responses from the AI modules to which the request was distributed. Through the predictive model, the AI module determines (316) a decision regarding the request based on the received responses, the current state of nodes and processes in the supply chain, and the context of the request.

The AI module responds (318) to the request with the decision and includes any information relevant to the request.

As an example of process 300, an AI module assigned to a seat manufacture node (e.g., the seat module) may receive a request from another AI module assigned to a seat foam manufacture node (e.g., the seat foam module). Such a request may be to, for instance, change the type of foam used to manufacture the seats. The seat module may determine, based on the respective trained predictive model and the context of the request, other nodes (e.g., the other part suppliers, such as a motor supplier, frame supplier, and cover material supplier) from which to request additional information regarding the original request and may forward the request to the AI modules assigned to the determined other nodes. The seat module may then receive responses approving or denying the request (or providing other information as described above) for the change to the foam material from the AI modules that were forwarded that request. The seat module responds to the request to change the type of foam with an approval or denial that is determined based on the received responses and a respective trained predictive model.

Figure 4:
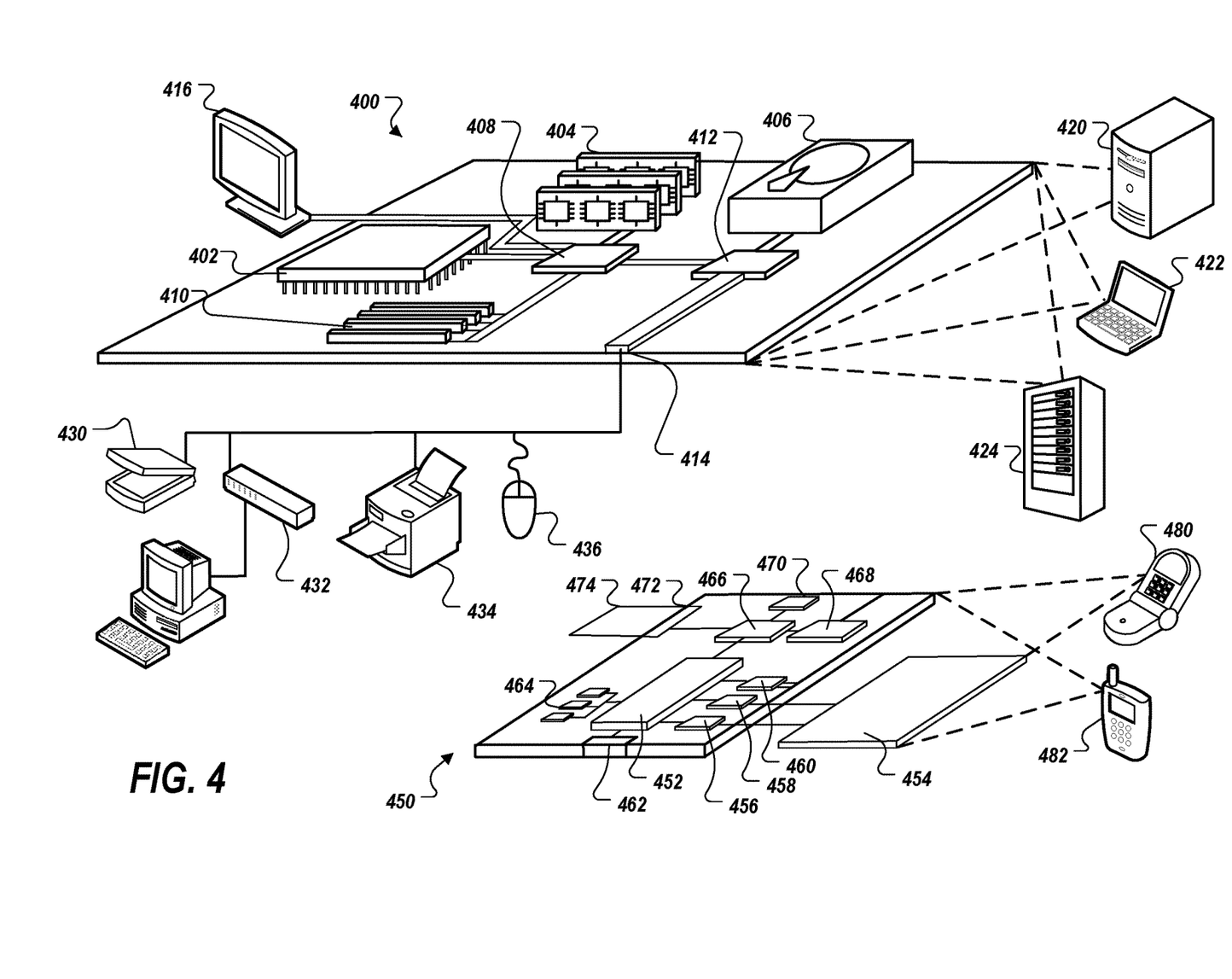
FIG. 4 shows an example of a computing device and a mobile computing device that can be used to implement the techniques described here.

FIG. 4 shows an example of a computing device 400 and a mobile computing device 450 that can be used to implement the techniques described here. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, and other similar computing devices. Additionally, computing device 400 or 450 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards. In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices. Such input/output devices may include a scanner 430, a printing device 434, or a keyboard or mouse 436. The input/output devices may also by coupled to the low-speed expansion port 414 through a network adapter. Such network input/output devices may include, for example, a switch or router 432.

The computing device 400 may be implemented in a number of different forms, as shown in the FIG. 4. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device, such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chip set of chips that include separate and multiple analog and digital processors. For example, the processor 452 may be a Complex Instruction Set Computers (CISC)

processor, a Reduced Instruction Set Computer (RISC) processor, or a Minimal Instruction Set Computer (MISC) processor. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a Thin-Film-Transistor Liquid Crystal Display (TFT) display or an Organic Light Emitting Diode (OLED) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a Single in Line Memory Module (SIMM) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as Global System for Mobile communications (GSM) voice calls, Short Message Service (SMS), Enhanced Messaging Service (EMS), or Multimedia Messaging Service (MMS) messaging, code division multiple access (CDMA), time division multiple access (TDMA), Personal Digital Cellular (PDC), Wideband Code Division Multiple Access (WCDMA), CDMA2000, or General Packet Radio Service (GPRS), among others. Such communication may occur, for example, through the transceiver 468 using a radio-frequency. In addition, short-range communication may occur, such as using a Bluetooth, Wi-Fi, or other such transceiver. In addition, a Global Positioning System (GPS) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone, personal digital assistant, or other similar mobile device.

Various implementations of the systems and techniques described here can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a cathode ray tube (CRT) or liquid crystal display (LCD) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
   receiving training data that includes private information for a node in a supply chain network that is private from other nodes in the supply chain network and information regarding previous decisions related to product change requests for a product manufactured through the supply chain network,
   where each node in the supply chain network represents a respective supplier that supplies a respective part used in producing a product and locations of the nodes in the supply chain network reflect which parts supplied by the suppliers are used by the suppliers to supply other parts;
   training, using the training data, a predictive model for the node that is configured to render decisions that approve or deny requests to change a part used in manufacturing the product;
   after a respective predictive model for each other node in the supply chain network is trained, with respective private data that is private from the other nodes in the supply chain network and the information regarding the previous decisions related to the product change requests for the product manufactured through the supply chain network, to render decisions that approve or deny requests to change a respective part used in manufacturing the product, receiving, from a requesting node in the supply chain network and by the node, a request to change a given part that is supplied by a requesting supplier represented by the requesting node and used in a part supplied by a given supplier represented by the node;
   applying the predictive model for the node to the request to change the given part;
   based on applying the predictive model for the node to the request to change the given part, identifying a plurality of other nodes in the supply chain network to forward the request;
   transmitting the request to change the given part to the other nodes that were identified;
   receiving, from each of the other nodes that were identified, a response to the request to change the given part, wherein each response from the other nodes was determined based on the respective predictive model of the other node and includes an approval or denial of the request to change the given part by the other node;
   applying the predictive model for the node to the responses received from the other nodes;
   based on applying the predictive model for the node to the received responses from the other nodes, determining a decision approving or denying the request to change the given part; and
   transmitting the decision to the requesting node.

2. The method of claim 1, wherein at least one of the other nodes corresponds to an Original Equipment Manufacturer (OEM) and wherein the response received from the OEM node overrides the decision determined based on applying the predictive model to the received responses.

3. The method of claim 2, wherein the supply chain network is an automotive supply chain network, and wherein the OEM manufactures vehicles with the product.

4. The method of claim 1, comprising:
   transmitting additional information with the request to the other nodes, wherein the additional information is determined based on applying the predictive model to the request.

5. The method of claim 1, wherein the requesting node is a supplier in a lower tier than the node in the supply chain network.

6. The method of claim 1, wherein the private information includes data regarding manufacturing process of the product or an actual cost of the product.

7. The method of claim 1, wherein the training data includes public information shared among the nodes within the supply chain network.

8. The method of claim 1, wherein the predictive models utilize neural networks, machine learning, deep learning, contextual intelligence, or data clustering.

9. One or more non-transitory computer-readable storage media coupled to one or more processors and having instructions stored thereon which, when executed by the one or more processors, cause the one or more processors to perform operations for automating change requests relating to a product manufactured through a supply chain network, the operations comprising:
   receiving training data that includes private information for a node in a supply chain network that is private from other nodes in the supply chain network and information regarding previous decisions related to product change requests for a product manufactured through the supply chain network,
   where each node in the supply chain network represents a respective supplier that supplies a respective part used in producing a product and locations of the nodes in the supply chain network reflect which parts supplied by the suppliers are used by the suppliers to supply other parts;

training, using the training data, a predictive model for the node that is configured to render decisions that approve or deny requests to change a part used in manufacturing the product;

after a respective predictive model for each other node in the supply chain network is trained, with respective private data that is private from the other nodes in the supply chain network and the information regarding the previous decisions related to the product change requests for the product manufactured through the supply chain network, to render decisions that approve or deny requests to change a respective part used in manufacturing the product, receiving, from a requesting node in the supply chain network and by the node, a request to change a given part that is supplied by a requesting supplier represented by the requesting node and used in a part supplied by a given supplier represented by the node;

applying the predictive model for the node to the request to change the given part;

based on applying the predictive model for the node to the request to change the given part, identifying a plurality of other nodes in the supply chain network to forward the request;

transmitting the request to change the given part to the other nodes that were identified;

receiving, from each of the other nodes that were determined, a response to the request to change the given part, wherein each response from the other nodes was determined based on the respective predictive model of the other node and includes an approval or denial of the request to change the given part by the other node;

applying the predictive model for the node to the responses received from the other nodes;

based on applying the predictive model for the node to the received responses from the other nodes, determining a decision approving or denying the request to change the given part; and transmitting the decision to the requesting node.

10. The non-transitory computer-readable storage media of claim 9, wherein at least one of the other nodes corresponds to an Original Equipment Manufacturer (OEM) and wherein the response received from the OEM node overrides the decision determined based on applying the predictive model to the received responses.

11. The non-transitory computer-readable storage media of claim 9, wherein the operations comprise:
transmitting additional information with the request to the other nodes, wherein the additional information is determined based on applying the predictive model to the request.

12. The non-transitory computer-readable storage media of claim 9, wherein the private information includes data regarding a manufacturing process of the product or an actual cost of the product.

13. The non-transitory computer-readable storage media of claim 9, wherein the training data includes public information shared among the nodes within the supply chain network.

14. A system, comprising:
one or more processors; and
computer-readable storage device coupled to the one or more processors and having instructions stored thereon which, when executed by the one or more processors, cause the one or more processors to perform operations comprising:

receiving training data that includes private information for a node in a supply chain network that is private from other nodes in the supply chain network and information regarding previous decisions related to product change requests for a product manufactured through the supply chain network, where each node in the supply chain network represents a respective supplier that supplies a respective part used in producing a product and locations of the nodes in the supply chain network reflect which parts supplied by the suppliers are used by the suppliers to supply other parts;

training, using the training data, a predictive model for the node that is configured to render decisions that approve or deny requests to change a part used in manufacturing the product;

after a respective predictive model for each other node in the supply chain network is trained, with respective private data that is private from the other nodes in the supply chain network and the information regarding the previous decisions related to the product change requests for the product manufactured through the supply chain network, to render decisions that approve or deny requests to change a respective part used in manufacturing the product, receiving, from a requesting node in the supply chain network and by the node, a request to change a given part that is supplied by a requesting supplier represented by the requesting node and used in a part supplied by a given supplier represented by the node;

applying the predictive model for the node to the request to change the given part;

based on applying the predictive model for the node to the request to change the given part, identifying a plurality of other nodes in the supply chain network to forward the request;

transmitting the request to change the given part to the other nodes that were identified;

receiving, from each of the other nodes that were determined, a response to the request to change the given part, wherein each response from the other nodes was determined based on the respective predictive model of the other node and includes an approval or denial of the request to change the given part by the other node;

applying the predictive model for the node to the responses received from the other nodes;

based on applying the predictive model for the node to the received responses from the other nodes, determining a decision approving or denying the request to change the given part; and transmitting the decision to the requesting node.

15. The system of claim 14, wherein at least one of the other nodes corresponds to an Original Equipment Manufacturer (OEM) and wherein the response received from the OEM node overrides the decision determined based on applying the predictive model to the received responses.

16. The system of claim 15, wherein the supply chain network is an automotive supply chain network, and wherein the OEM manufactures vehicles with the product.

17. The system of claim 14, the operations comprising:
transmitting additional information with the request to the other nodes, wherein the additional information is determined based on applying the predictive model to the request.

18. The system of claim 14, wherein the requesting node is a supplier in a lower tier than the node in the supply chain network.

19. The system of claim 14, wherein the private information includes data regarding manufacturing process of the product or an actual cost of the product.

\* \* \* \* \*